United States Patent [19]

Hedayat et al.

[11] Patent Number: 5,642,516

[45] Date of Patent: Jun. 24, 1997

[54] SELECTIVE SHADOWING OF REGISTERS FOR INTERRUPT PROCESSING

[75] Inventors: Shahin Hedayat, San Ramon; Surendra Mandava, San Jose, both of Calif.

[73] Assignee: Cirrus Logic, Inc., Fremont, Calif.

[21] Appl. No.: 324,077

[22] Filed: Oct. 14, 1994

[51] Int. Cl.$^6$ .............................. G06F 13/32; G06F 13/24
[52] U.S. Cl. ........................ 395/733; 395/734; 395/737; 395/868
[58] Field of Search ............................ 395/733, 734, 395/737, 739, 868, 488, 489

[56] References Cited

U.S. PATENT DOCUMENTS

| | | | |
|---|---|---|---|
| 4,261,034 | 4/1981 | Saccomano et al. | 395/869 |
| 5,115,506 | 5/1992 | Cohen et al. | 395/740 |
| 5,283,904 | 2/1994 | Carson et al. | 395/739 |
| 5,481,685 | 1/1996 | Nguyen et al. | 395/375 |

*Primary Examiner*—Jack B. Harvey
*Assistant Examiner*—Ario Etienne
*Attorney, Agent, or Firm*—William E. Alford; David L. Stewart; J. P. Violette

[57] ABSTRACT

Interrupts are prioritized such that selected interrupts use shadow registers to save the current state of the machine, whereas other interrupts use a software implemented interrupt service routine (ISR) to save and restore the current machine state. Hence, the number of nested interrupts that can be serviced will not be limited to the depth of register shadowing.

13 Claims, 5 Drawing Sheets

SELECTIVE SHADOWING OF REGISTERS FOR INTERRUPT PROCESSING

TECHNICAL FIELD

The present invention is applicable to the field of interrupt driven microprocessors, and more particularly to a new interrupt implementation using both hardware and software based interrupt processing.

BACKGROUND ART

Referring to FIG. 1, a conventional data processing system comprises a CPU 12 which may be implemented by a microprocessor, a system memory 14 which usually is in the form of dynamic random access semiconductor memory, and a basic input/output system (BIOS) 16 which develops appropriate electrical signals for testing and controlling the various hardware devices within the system before control is assumed by the operating system during initialization. An input/output (I/O) controller 18 contains basic resources, such as interrupt controllers and DMA controllers which relieve the microprocessor from involvement in every task that is performed by the system. Other controllers, designated by block 20, develop signals necessary for operating peripherals such as hard disk and floppy drives, video monitor and keyboard.

Computers perform complicated tasks by segmenting any task into many smaller task and executing those tasks repetitively or sequentially, and at very high speed, under control of fixed programming called an operating system (example: DOS) which interacts with the computer components themselves, and application software (example: spreadsheet) which interacts with the user and is customized for each user application. The computer system, while executing these programs, responds both to signals developed internally and those developed from the outside to interrupt its normal execution and attend to special tasks.

In any real-time microprocessor based system, the ability to efficiently handle these interrupts in a timely manner has a considerable effect on the overall performance of the system. When activated, interrupts temporarily or permanently suspend the operation of the microprocessor and redirect operation to an interrupt routine. Such interrupt routines may represent software driven routines, such as a subroutine calling a special task, or may be driven by an external input (e.g., keyboard interrupt).

Interrupt servicing is conventionally carried out as shown in the flow chart of FIG. 2. Assume that a command to print a document is received from the keyboard (step 20). The application software generates an interrupt signal demanding immediate attention by the operating system (step 22). The value of the interrupt tells the operating system what service is being requested.

The interrupt signal is intercepted by the I/O controller that in turn notifies the CPU that an interrupt has occurred and requires immediate attention. The CPU saves the memory address of the current operation, reads from a data register, onto a "stack" in the memory 14 (step 24), and then reads the memory address associated with the interrupt to find an address vector to a location describing how to carry out the function defined by the interrupt (26). In this example, a BIOS routine takes over, sending the appropriate characters stored elsewhere in the memory to the printer. Assuming the BIOS controlled print routine is performed successfully, the BIOS sends an interrupt return instruction to the CPU, directing it to retrieve from the top of the memory stack the address of the application software routine that was being executed when the interrupt request was received, and restore operation.

Occasionally, a condition known as a "nested interrupt" arises, when more than one interrupt service are to be carried in sequence. This can result from interrupt service routines that require the service of other interrupt routines to carry out the function specified, or from multiple interrupts arriving independently.

Inefficiency in handling interrupts arises from the fact that a significant amount of time is expended by the interrupt service routine in order to handle each incoming interrupt by saving and restoring the state of the machine. For example, it may take 60 to 70 CPU clock cycles to save the contents of all data registers, and an additional 60 to 70 clock cycles to restore the contents of the data registers and continue processing.

To better cope with this situation, so-called "shadow" registers have been employed to save the contents of corresponding data registers upon an interrupt call. In shadow register architecture, each data register is provided with a corresponding "shadow" register. When an interrupt is generated the contents of all data registers, such as register DR, are each simultaneously stored into the corresponding shadow register SHR, as shown in FIG. 3. This simultaneous transfer of data may be accomplished in as little as one clock cycle. The interrupt routine is then executed. When the interrupt routine is completed, processing is returned to the point where the interrupt routine is generated by transferring the contents of the shadow registers back to their corresponding data registers. This simultaneous transfer of data can take place in as little as one additional clock cycle.

The use of shadow registers eliminates the time problem associated with the ISR approach. However, if only one shadow register is provided for each data register within the microprocessor, interrupt routines cannot be nested. In other words, if an interrupt routine is generated during the execution of an existing interrupt routine, the original status of the data registers will be lost. The first interrupt routine will force the contents of the data registers to be stored into the corresponding shadow registers. The interrupt routine is then executed. If a second interrupt routine is executed during the first interrupt routine, the contents of the data registers, as determined by the first interrupt routine, will be transferred to the shadow registers. The data in the shadow registers will then be lost. Thus, when the first and second interrupt routines are completed, processing cannot be returned to the original point where the first interrupt routine was generated as the original status of the data registers has not been preserved.

In order to overcome this difficulty, several shadow registers have been used, as shown in FIG. 4. By providing 2, 3, or more shadow registers, e.g., SH1, SH1a, SH1b, etc., for each data register, e.g. D1, a number of nested interrupt routines may be executed without the loss of register data. As each set of nested interrupt routines is generated, the contents of each data register is transferred to a corresponding shadow register. As there are a number of corresponding shadow registers for each data register, the contents of each data register for each interrupt routine may be saved. These groups of data registers are configured as a stack (e.g., in a LIFO format) such that the contents of the data register at the generation of the previous interrupt routine is always at the top of the stack.

While such an approach provides fast storage of the contents of the data registers and allows the nesting of interrupt routines, a large amount of hardware is necessary to implement such a design. In particular, a number of shadow registers equals to the permissible number of nested interrupts must be provided for each data register, increasing the complexity and cost of the microprocessor. However, it is still possible to overflow the stack if more than the prescribed number of nested interrupts are generated. Hence, shadow registering of nested interrupts is not cost effective as well as imposes a randomness to the design of the CPU per application The conventional approach accordingly has been to ignore use of shadow registers, implementing instead the ISR technique, to service nested interrupts. However, this method wastes processor resources that are already imbedded in the hardware.

DISCLOSURE OF THE INVENTION

The present invention overcomes these difficulties by providing a technique for prioritizing different types of interrupts such that prescribed interrupts utilize shadow registers to store the contents of data registers while other interrupts use the software implemented ISR technique to store the contents of the data registers into system memory.

More particularly, an interrupt controller, in accord with the invention, comprises means for receiving a request for an interrupt and determining an associated interrupt priority. A shadow register saves the content of a corresponding data register representing the address of the operation state of the application upon receipt of an interrupt. In addition, an interrupt service routine (ISR) routine is available for servicing interrupts. Each interrupt is serviced by the shadow register or ISR routine, selectively, in accord with interrupt priority. As discussed in the Background, it is to be appreciated that ISR routines often cover more than just storing the contents of data registers and program counter (pc). Rather, an ISR also services functional aspects of an interrupt (i.e., carry out the function that the interrupt was triggered to perform such as sending data from memory to printer). As such, whether the contents of data registers are stored using shadow registers or ISR technique, control is eventually returned to an ISR to carry out the function of the interruption. This is shown in step 60 of FIG. 5.

Preferably, multiple shadow registers are arranged in stacks corresponding to data registers for servicing nested interrupts. A trap is arranged for detecting receipt of an interrupt request, and the system includes means for (1) enabling shadow registers for storing contents of data registers when the interrupt is of a high priority, and (2) calling the ISR routine for storing contents of data registers when the interrupt is of a lower priority.

In accordance with a particular aspect of the invention, a method of servicing nested interrupts comprises the steps of:

detecting incoming interrupt requests;

determining a classifications of the interrupts;

servicing interrupts of a first classification by transfer of data, corresponding to a current operation of the system, from at least one data register to at least one shadow register; and servicing interrupts of a second classification by executing an interrupt service routine (ISR) routine to store the contents of data registers;

wherein the preceding two steps are performed sequentially in either order.

Hence, the invention, combining the attributes of shadow registering and ISR for interrupt processing, services nested interrupts without complicating the architecture of a microprocessor while retaining the speed of shadow register processing of selected interrupt calls.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
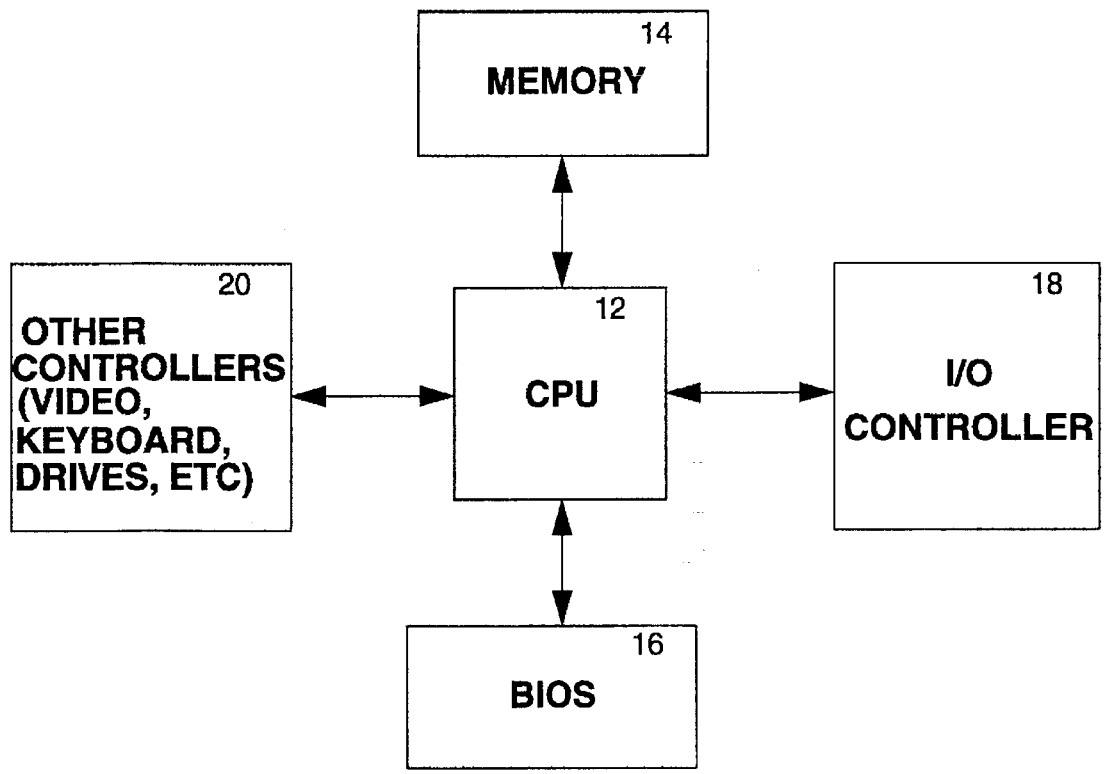
FIG. 1 is a block diagram of a conventional data processing system within which the invention may be used.
Figure 2:
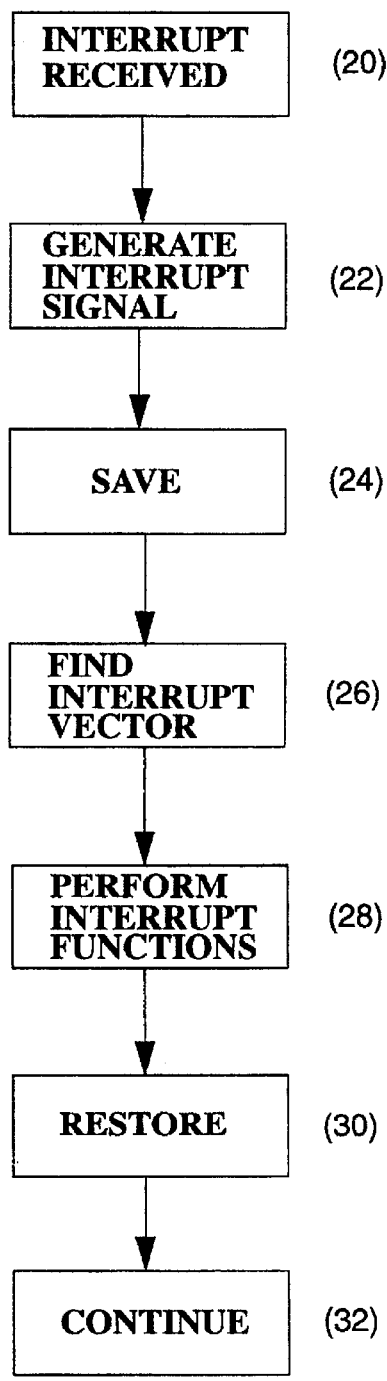
FIG. 2 is a flow chart showing the conventional interrupt save and restore (ISR) technique.
Figure 5:
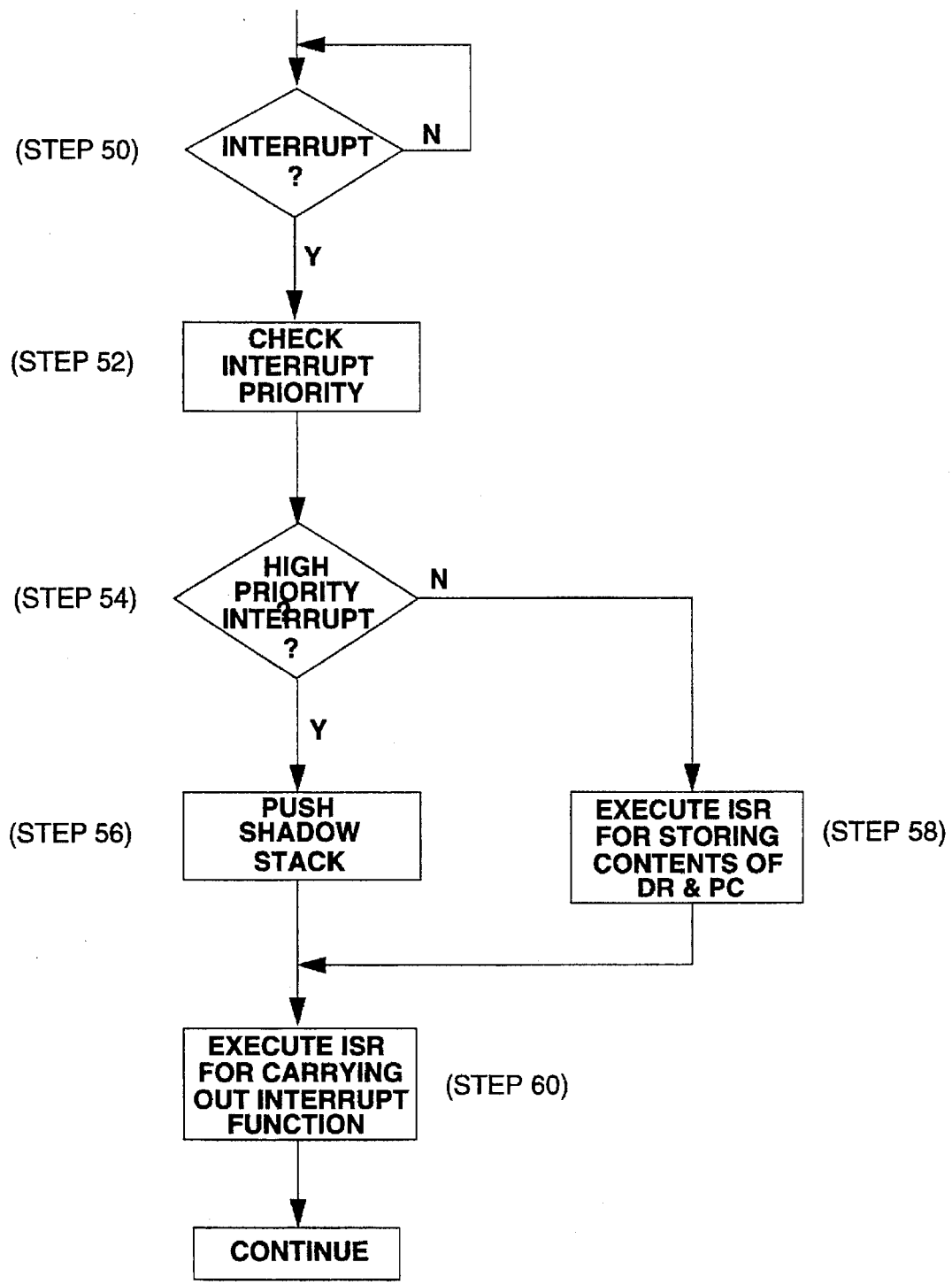
FIG. 5 is a flow chart showing selective shadowing of registers for interrupt processing, in accord with the invention.
Figure 6:
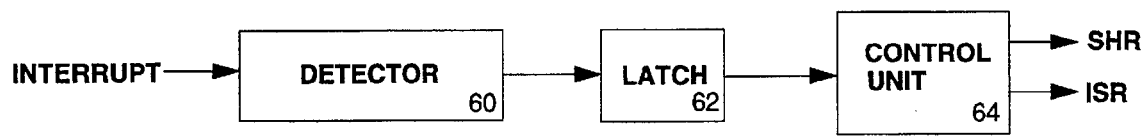
FIG. 6 is diagram showing a preferred embodiment of the invention.

Referring to FIG. 5, when a data processing system of the type shown in FIG. 1 or other types of data processing wherein servicing of interrupts arises, an interrupt processor, which is a functional circuit embedded in I/O controller 18, waits for a receipt of an interrupt request signal, as shown in step 50. This is performed by a software filter or trap that detects the bit pattern of an interrupt request. When a request for interrupt service is received, the interrupt processor checks the priority of the interrupt. Referring to FIG. 6, for example, priority may be determined by a priority detector 60 that responds to the interrupt by developing a signal which is temporarily stored in a latch 62. The signal stored in latch 62 is applied to a control unit 64 which produces a signal SHR or ISR depending on the priority or other characteristic of the interrupt INT. The detector 60 shown in FIG. 6 is only symbolic of the function performed. This function is conventionally carried out by an interrupt request controller, or IRR, that sets a corresponding bit for each interrupt request received. The interrupt controller then prioritizes the interrupts that it has received and sets a bit in an in-service register, or ISR, corresponding to the interrupt request with the highest priority in its IRR. Once one of the bits in the ISR is set to 1, all other interrupts with the same or lower priority are inhibited. Interrupts with a higher priority are noted and serviced next.

Figure 3:
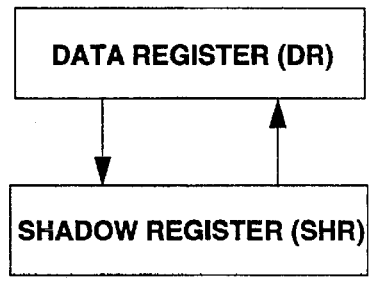
FIG. 3 is a diagram showing a conventional shadow register for interrupt processing.
Figure 4:
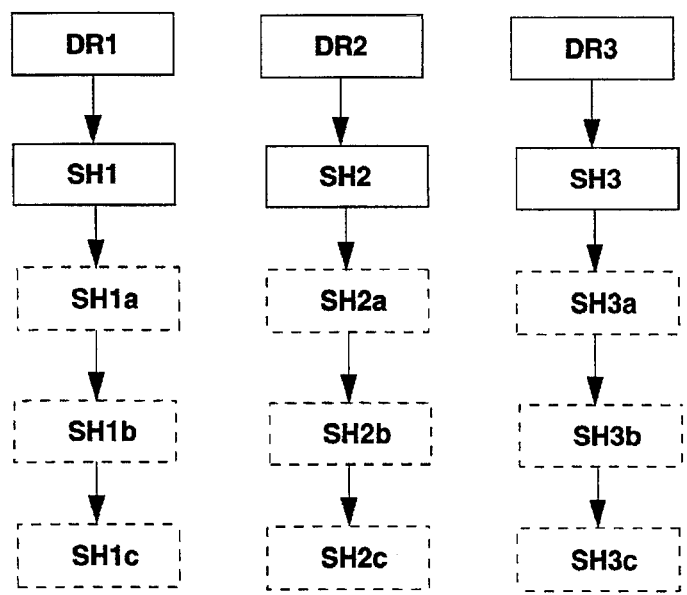
FIG. 4 is a diagram showing stacked shadow registers for nested interrupt processing.

In accordance with the invention, however, depending upon the priority of the interrupt received, as determined during step 54, an interrupt is serviced either by shadow registering (to store the contents of data registers, program counter) (step 56) or an ISR routine (to store the contents of data registers program counter) (step 58), controlled by control unit 64 of FIG. 6. Preferably, interrupts of high priority receive servicing by the shadow register SHR of FIG. 3 or a shadow register stack as shown in FIG. 4 to store the contents of data registers, PC, whereas interrupts of lower priority are serviced by the ISR routine to store the contents of data registers and PC. Alternatively, the first interrupt requests that are received can be serviced by available shadow registers, whereas others receive ISR routine service. This is advantageous over the prior art, since interrupt processing speed is optimized through use of hardware processing if shadow registers are available. When no shadow registers are available, the slower software based ISR servicing of interrupts is performed. For example, if hardware supports up to 4 levels of shadow depth, it is possible to service additional interrupts with software save and restore.

The invention is particularly advantageous for servicing nested interrupts. In this respect, the number of shadow registers in the stack corresponding to each data register is equal to the number of nested interrupts authorized. For example, if 4 shadow registers per data register are available, then the system accommodates up to 4 nested interrupts in hardware. However, even if additional interrupt requests are received, they are serviced, not discarded, as a result of the availability of software implemented save and restore.

An example of a nested interrupt condition is as follows. Assume that a first interrupt condition arises and is determined by the priority detector 60 to be of priority that justifies servicing by a shadow register. The current state of the processor, the address of which is in a first data register such as D1 is FIG. 4, is saved in a first shadow register by pushing the first shadow register stack. This is carried out by priority detector 60 that applies a signal to latch 62 for holding and then the signal is transferred to control unit 64 to generate the appropriate signal SHR. If a second interrupt condition next arises of priority that justifies servicing by a shadow register, the stack is pushed again, such that the state stored in register SH1 moves to register SH1a and the content of D1 at the time of interrupt is saved in register SH1.

Assume next that another interrupt is received, but that this interrupt is of a priority that does not receive shadow register processing. This interrupt will be serviced by an ISR routine, and control unit 64 of FIG. 6 will generate the appropriate signal ISR.

If another interrupt of high priority is received, that interrupt is serviced by another push of the shadow register stack. The content of data register D1 is saved in shadow register SH1, and the contents of registers SH1 and SH1a are moved to registers SH1a and SH1b, respectively. If in the example, yet another interrupt for shadow register servicing is again received, there is another push, and all registers of the stack become filled.

If the next interrupt is of priority for servicing by shadow register, however, because all the levels of the shadow register stack are filled, the interrupt is serviced by the ISR routine, per the circuit of FIG. 6, rather than by shadow registering.

As the interrupt routines addressed by the various interrupts become completed, the shadow register stacks are popped, in last in-first out fashion, returning control of the CPU to the application program.

Interrupt processing is similar for the other data registers shown in FIG. 4.

In the invention, the minimum configuration requires a single level of shadow registers for each data register served. By preselecting the push of the shadow registers to one selected interrupt source and not pushing the shadow registers on any other incoming interrupt source, one shadow register is always available for at least one interrupt level.

The conditional push of the shadow registers can be performed as a configuration register in the system, whereby which of the incoming interrupts will be shadowed is specified. Hence, it is not necessary to save and restore the state of the processor for the ISRs that are already shadowed. Of course, interrupts not shadowed will still require, and will receive, save and store procedures.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein. For example, although interrupt detection is performed in hardware in the embodiment shown in FIG. 6, interrupt priority detection and servicing alternatively can be performed in software.

We claim:

1. In a data processor having a central processing unit, a system memory, controllers for data input and output devices, and at least one data register for storing the address of a current operation of the central processing unit as a result of an application,
   an interrupt processor, comprising:
   means for receiving a request for an interrupt and determining an associated interrupt priority;
   a shadow register for saving the content of a corresponding data register representing the address of the operation state of the application upon receipt of an interrupt;
   means to carry out an interrupt save and restore (ISR) routine for servicing interrupts; and
   means for servicing the interrupt by said shadow register and said ISR routine, selectively, in accord with interrupt priority.

2. The interrupt processor of claim 1, including multiple shadow registers arranged in a stack for servicing nested interrupts.

3. The interrupt processor of claim 2, including plural shadow register stacks corresponding respectively to plural data registers.

4. The interrupt processor of claim 1, including a control unit for determining priority of an interrupt, and means for enabling the shadow register or the ISR routine, selectively, based on said priority.

5. The interrupt processor of claim 1, including a trap for detecting a receipt of an interrupt request, and means for (1) enabling said shadow register for service when the interrupt is of a first type, and (2) calling the ISR routine for service when the interrupt is of a second type.

6. The interrupt processor of claim 5, wherein the first type of interrupt is of higher priority than the second type.

7. A method of servicing interrupts in a data processing system, comprising the steps of:
   detecting an incoming interrupt request;
   determining a classification of the interrupt;
   if the classification of interrupt is of a first type, servicing the interrupt by transfer of data, corresponding to a current operation of the system, from at least one data register to at least one shadow register; and
   if the classification of interrupt is of a second type, servicing the interrupt by executing an interrupt save and restore (ISR) routine.

8. The method of claim 7, wherein said classification is based on interrupt priority.

9. The method of claim 8, wherein interrupts of high priority are serviced by a shadow register, and interrupts of lower priority are serviced by the ISR routine.

10. The method of claim 9, including multiple incoming interrupts, and wherein shadow register and ISR routing servicing are successively performed.

11. A method of servicing nested interrupts in a data processing system, comprising the steps of:

detecting incoming interrupt requests;

determining a classifications of the interrupts;

servicing the interrupts of a first classification by transfer of data, corresponding to a current operation of the system, from at least one data register to at least one shadow register; and servicing the interrupts of a second classification by executing an interrupt save and restore (ISR) routine;

wherein the preceding two steps are performed sequentially in either order.

12. The method of claim 11, wherein said classification is based on interrupt priority.

13. The method of claim 12, wherein interrupts of high priority are serviced by at least one shadow register, and interrupts of lower priority are serviced by the ISR routine.

* * * * *